July 8, 1958 M. H. GRAHAM 2,842,200

TIMING DEVICE

Filed May 5, 1954 5 Sheets-Sheet 1

INVENTOR

MAURICE H GRAHAM

BY William C Babcock ATTORNEY

July 8, 1958 M. H. GRAHAM 2,842,200

TIMING DEVICE

Filed May 5, 1954 5 Sheets-Sheet 2

INVENTOR

MAURICE H GRAHAM

BY William C. Babcock ATTORNEY

INVENTOR
MAURICE H GRAHAM
BY William C. Babcock ATTORNEY

July 8, 1958 M. H. GRAHAM 2,842,200

TIMING DEVICE

Filed May 5, 1954 5 Sheets-Sheet 4

INVENTOR
MAURICE H GRAHAM

BY William C. Babcock ATTORNEY

July 8, 1958 M. H. GRAHAM 2,842,200

TIMING DEVICE

Filed May 5, 1954 5 Sheets-Sheet 5

INVENTOR
MAURICE H GRAHAM

BY William C. Babcock ATTORNEY

United States Patent Office 2,842,200

Patented July 8, 1958

2,842,200

TIMING DEVICE

Maurice H. Graham, Minneapolis, Minn., assignor to General Mills, Inc., a corporation of Delaware Application May 5, 1954, Serial No. 427,748

8 Claims. (Cl. 161—1)

This invention relates to timing devices and more particularly to a self-compensating thermal timer suitable for use with household appliances such as toasters.

Various thermal timing devices have been proposed in the past. Some of these devices involve timing members which move through a predetermined path under the control of a thermally responsive member to measure the timed interval.

It is one object of the present invention to provide an improved timing device of this general type.

A further object is a timing device in which a tripping member for the termination of a timed interval is actuated by the driving means which controls movement of a timing member from one position to another.

Another object is a timing device in which an escapement member moves step wise through a plurality of intermediate positions under the control of a cyclically operable pawl mechanism.

Still another object is such a timing device in which the pawl mechanism is operated by cyclic heating and cooling of a thermally responsive member.

A further object is a timing device in which a thermally responsive member is connected with the timing mechanism in an improved manner to provide automatic compensation for variations in ambient temperature and in the period of inactivity between successive operations of the device.

Other objects and advantages will be apparent from the following specification in which a preferred embodiment of the invention is described. In the drawings which form a part of this application and in which like reference characters indicate like parts, Figure 1 is a partial perspective view of a timing device according to the invention, with portions broken away for clarity;

Figure 1:
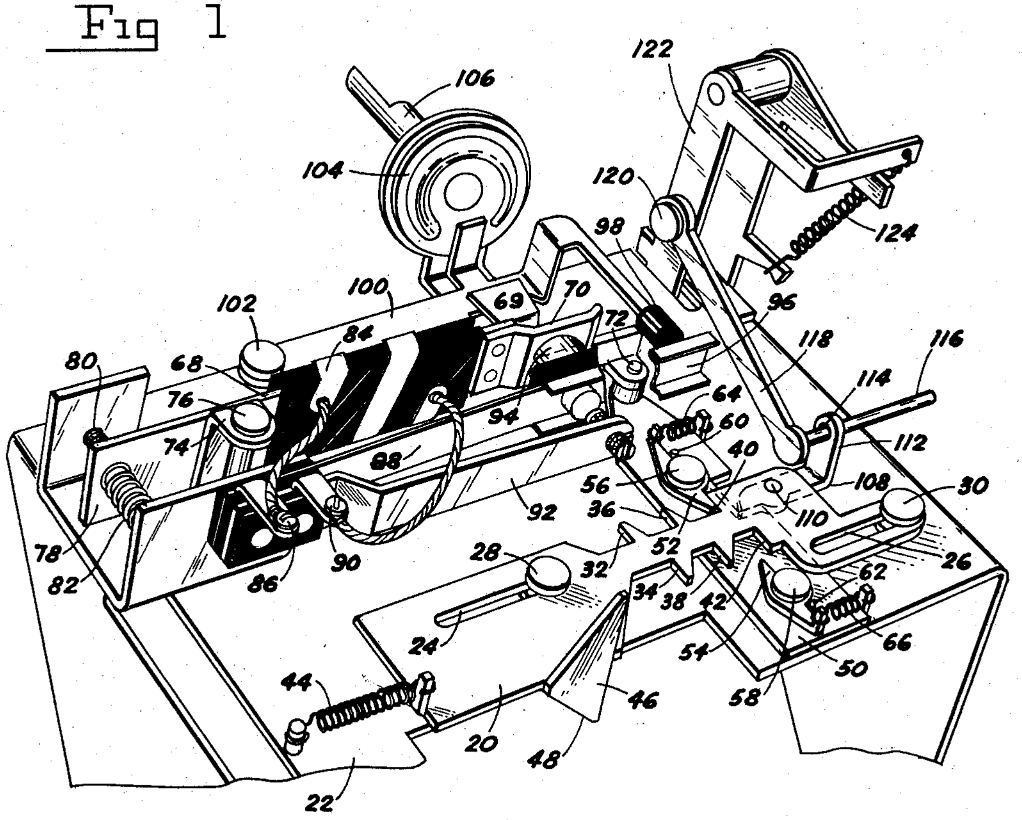
Figure 2:
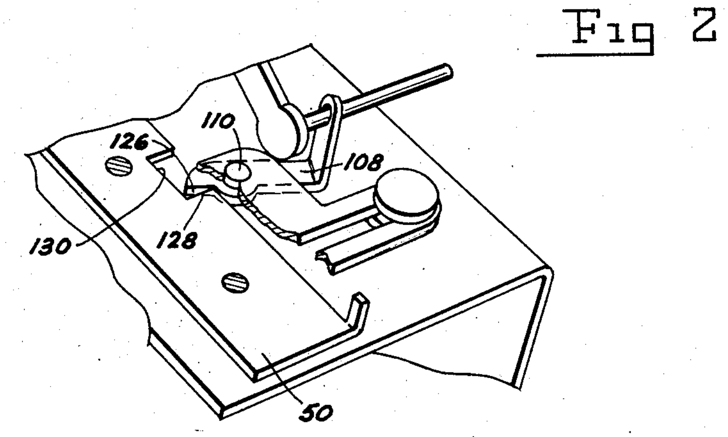
Fig. 2 is an enlarged partial view of the tripping and release mechanism of the device of Fig. 1.

As shown in Figs. 1 and 2, the timing device according to the present invention includes a movable timing member 20 supported on a timer base plate 22. In the embodiment shown, the timing member 20 is guided for sliding or longitudinal movement on the base member by means of slots 24 and 26 which engage studs 28 and 30 secured to the plate 22.

In this case the timing member 20 is illustrated as an escapement member having a plurality of ratchet teeth or stops thereon. These teeth are indicated in their operating sequence at 32, 34, 36, 38, 40 and 42. As shown in Fig. 1, the teeth are located alternately at opposite edges of the escapement member for a purpose to be described.

A spring 44 normally urges the timing escapement member 20 resiliently toward the left in Fig. 1. For convenience, this position of the timing member will be referred to as its second position, because it is the position assumed by the member 20 at the end of a timed interval. Member 20 is also provided with a flange 46 having an inclined cam surface 48 designed for cooperation with setting means to be described in order to move the member 20 to the right in Fig. 1 to what will be designated as its first position, i. e., the position assumed at the start of the timed interval.

According to the invention, cyclically movable pawl mechanism is provided to control the movement of the timing member 20 from its first to its second position and to require step wise movement of the member during its travel. The pawl mechanism includes a reciprocable pawl member 50 which is illustrated in the form of a slide. The slide 50 is mounted on the base plate 22 between the base plate and timing member 20 and is designed to reciprocate across the path of movement of the timing member.

The slide 50 carries cooperating pawls 52 and 54 which are pivoted respectively at 56 and 58 to the slide. These pawls are resiliently urged against stops 60 and 62 by springs 64 and 66 respectively. The resilient mounting of these pawls permits them to rock and pass over the ratchet teeth 32—42 when the timing member 20 is initially moved from the position of Fig. 1 to its first or starting position. At the same time, the stops 60 and 62 cause the pawls to engage the respective ratchet teeth successively in the manner described below to provide the desired step wise movement of the timing member.

The cyclically operable pawl mechanism, which may be considered as the driving means controlling step wise movement of the timing member 20, includes a thermally responsive member 68 which has been shown as a bimetallic strip. A first end 69 of this bimetallic strip is operatively connected to the pawl slide 50 by means of an extension 70 pivotally connected at 72 to the slide. Extension 70 is made of magnetically permeable material for a purpose to be described. The bimetallic strip 68 is secured to a supporting bracket 74 which is pivotally mounted at 76. Thus the bimetal is pivotally supported at an intermediate point between its ends.

The second end 78 of the bimetal thus projects in the opposite direction from the pivot 76 and is adapted to be urged toward an adjustable stop 80 under the influence of a spring 82. Actual rotation of the bimetallic strip 68 on its pivotal support 76 is limited by the direct connection of the first end 69 of the strip to the pawl slide 50. Thus the means (not shown) limiting the reciprocation of the slide 50 also serves effectively to limit the movement of the first end 69 of the bimetallic strip.

In order to provide for cyclic heating and cooling of the strip 68, an electric heating resistance 84 is wound around the strip on suitable insulating supports. One end of the resistance heating element 84 is connected to a terminal 86 which in turn is electrically connected to a first switch arm 88. The other end of the heating element 84 is connected through a terminal 90 to a second switch arm 92. Thus engagement of contacts carried by the first and second switch arms 88 and 92 will effectively shunt or by-pass the heating element to cut it out of the main circuit described below, during the cooling portions of the timing cycle.

The contact arm 88 carries a small magnet 94 designed to cooperate with the extension 70 on the bimetallic strip 68. The outer end 96 of the contact arm 88 is also adapted to engage an insulating member 98 at the outer end of an adjustable stop lever 100. This lever 100 is pivoted at 102 to the base plate 22 and its limiting position is determined by a cam 104 carried by a rotatable adjusting shaft 106.

According to a further feature of the invention, the timing device is provided with release means operable to terminate the desired timed interval. This release means includes a tripping member 108 which is movably supported on the timing member 20. As described below, the tripping member is relatively movable on the timing member 20 from a first or normal position, in which the release means will remain inoperative, to a second or tripping position in which the tripping means moves the release means to terminate the interval. Furthermore, the tripping member is also bodily movable as a unit with said timing member between a disengaged position and a position in which it will be tripped by the cyclically movable pawl mechanism. In this case the tripping member is in the form of a lever pivoted to the timing escapement at 110. One arm of the lever includes an upstanding lug 112 having an opening 114 engaged by a shaft 116. Shaft 116 is carried at the end of a connecting arm 118, the other end of which is pivoted at 120 to a latch member 122. A spring 124 normally urges latch 122 to its latching position as illustrated in Fig. 1.

The opening 114 provides for sliding engagement of the lug 112 with rod 116 so that the parts will remain in engagement without relative longitudinal movement of member 116 during the setting and operating movements of the timing escapement 20. For this purpose rod 116 is parallel to slots 24 and 26.

The opposite end 126 of tripping lever 108 is designed for engagement with a release abutment 128 on the reciprocating pawl slide 50. Abutment 128 is conveniently provided by means of a notch 130 in one edge of the slide 50. Both the lever 108 and pawl slide 50 are located between the timing escapement 20 and base plate 22, so that they are held in a common plane with no danger of accidental failure to engage each other.

Thus the lever end 126 and abutment 128 provide cooperating means on the tripping member and pawl mechanism which are normally out of driving engagement with each other until the timing member moves to its final or second position. Upon such final movement, however, these cooperating means 126 and 128 become engaged and thus operatively connect said parts for movement of the tripping member by the pawl slide when the timing member 20 is in its second position as shown in Figs. 1 and 2. In this position, the final heating cycle of the bimetallic strip 68 will move the slide 50 upwardly as shown in Fig. 2 to rock the tripping member 108 from its normal to its tripping position and pull the connecting arm 118 and latch 122 downwardly as viewed in these figures. As indicated below, this movement of the latch 122 will effectively terminate the operation of the timing device and its associated mechanism.

Figure 3:
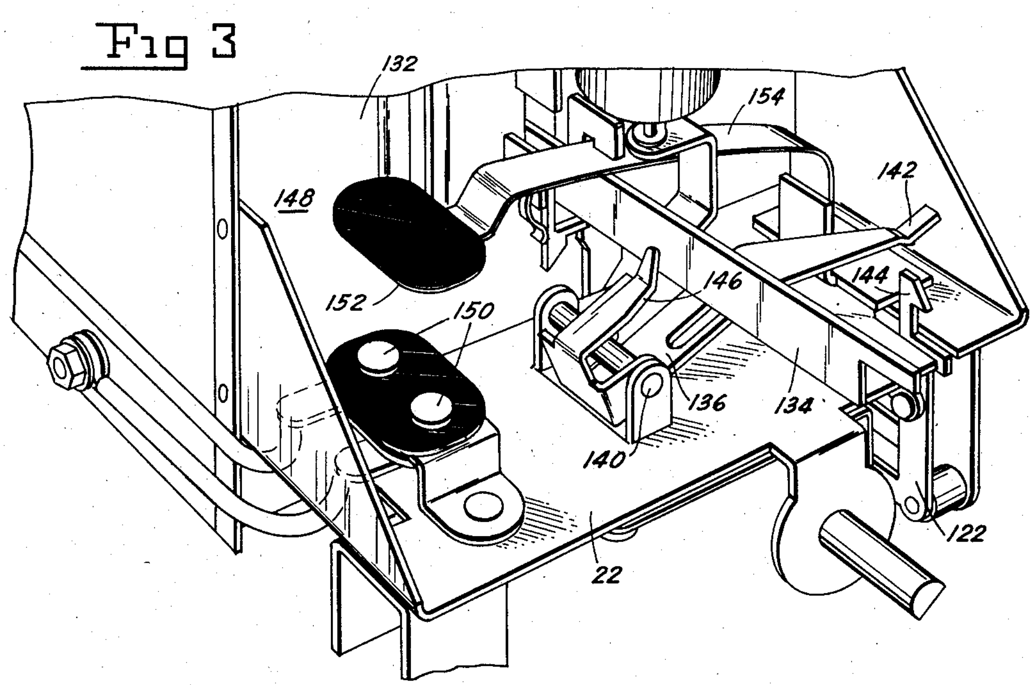
Fig. 3 is a partial perspective view of an electric toaster incorporating the timing device of Fig. 1.

In order to show the application of the timing device to an appliance, the device has been illustrated as attached to an electric toaster. The toaster is partially shown in Figs. 3 through 7. As indicated in Fig. 3, the base plate 22 of the timing device is supported adjacent one end wall 132 of the associated toaster. Since the construction of electric toasters is well known in the art, the parts of the toaster not essential to the present invention will not be described.

In one form of prior art toaster, however, it is customary to provide a starting means in the form of a starting or operating lever which is illustrated at 134 in these figures. Lever 134 is designed for manual operation from an upper to a lower position to initiate the toasting operation. Such movement of the lever customarily causes the downward movement of suitable bread carriers to move the bread down from an initial upper position to a lower toasting position. At the end of the toasting operation, upward movement of the lever, under the influence of a suitable spring (not shown) is designed to raise the carriers and lift the toast to an ejecting position.

Figure 4:
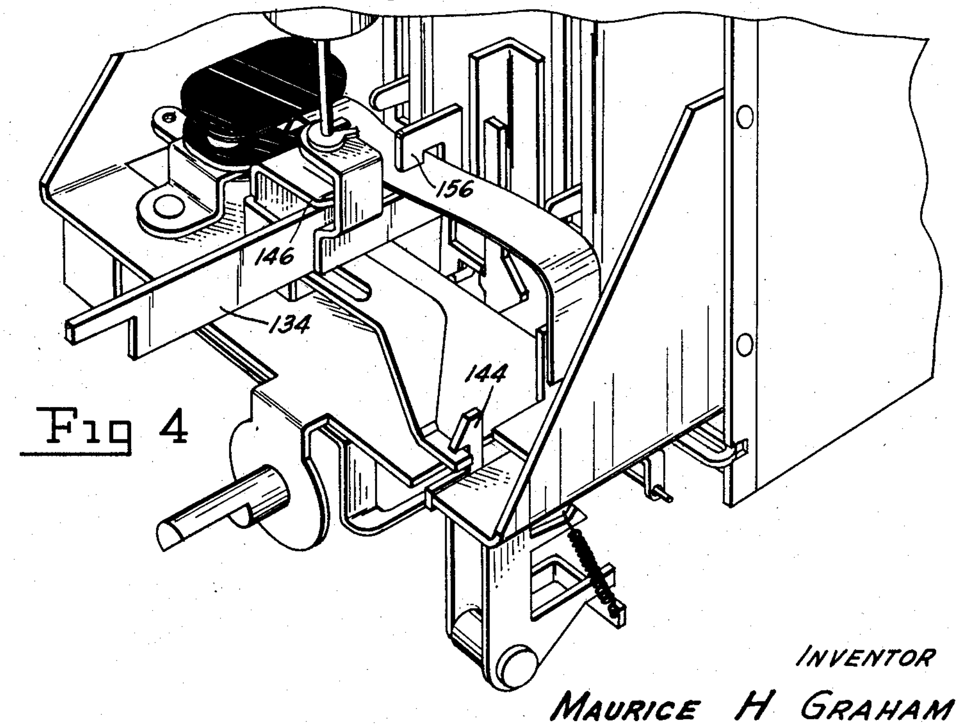
Fig. 4 is a perspective view of the device of Fig. 3 after the device has been operated to initiate a toasting period.

For purposes of this invention, it is sufficient to note that the lever 134, when moved downwardly from the initial position of Fig. 3 to the starting position of Fig. 4, will engage a lever arm 136 and rotate the lever arm about its pivot 140 as shown in these figures. As the lever arm 136 is moved downwardly, its outer end 142 is caught beneath the retaining lug 144 on latch member 122 already described. During this movement a locking arm 146 on lever 136 will be moved into position above the starting lever 134. Thus upward return movement of lever 134 under the influence of its return spring is prevented until the latch member 122 is moved to release the lever end 142 from the lug 144. This releasing movement will take place at the end of the time interval by operation of the tripping member already described.

The toaster includes a main switch 148 including spaced fixed contacts 150. These contacts are designed to be bridged by a suitable bridging member 151 (Fig. 8) carried on the undersurface of an insulating member 152. Member 152 is carried by a resilient spring arm 154 as shown in Figs. 3 and 4. The switch is closed by downward engagement of a projection 156 on lever 134 against switch supporting arm 154 in response to downward movement of the starting lever. Thus the main switch will be closed to energize the toaster when the starting lever is moved to the position of Fig. 4. By virtue of the circuit connections to be described below in connection with Fig. 8, this initial movement of the starting lever and the closing of switch 148 will also energize the heater 84 to start the cyclic heating and cooling of the bimetallic pawl actuating mechanism.

Figures 5, 6, 7:
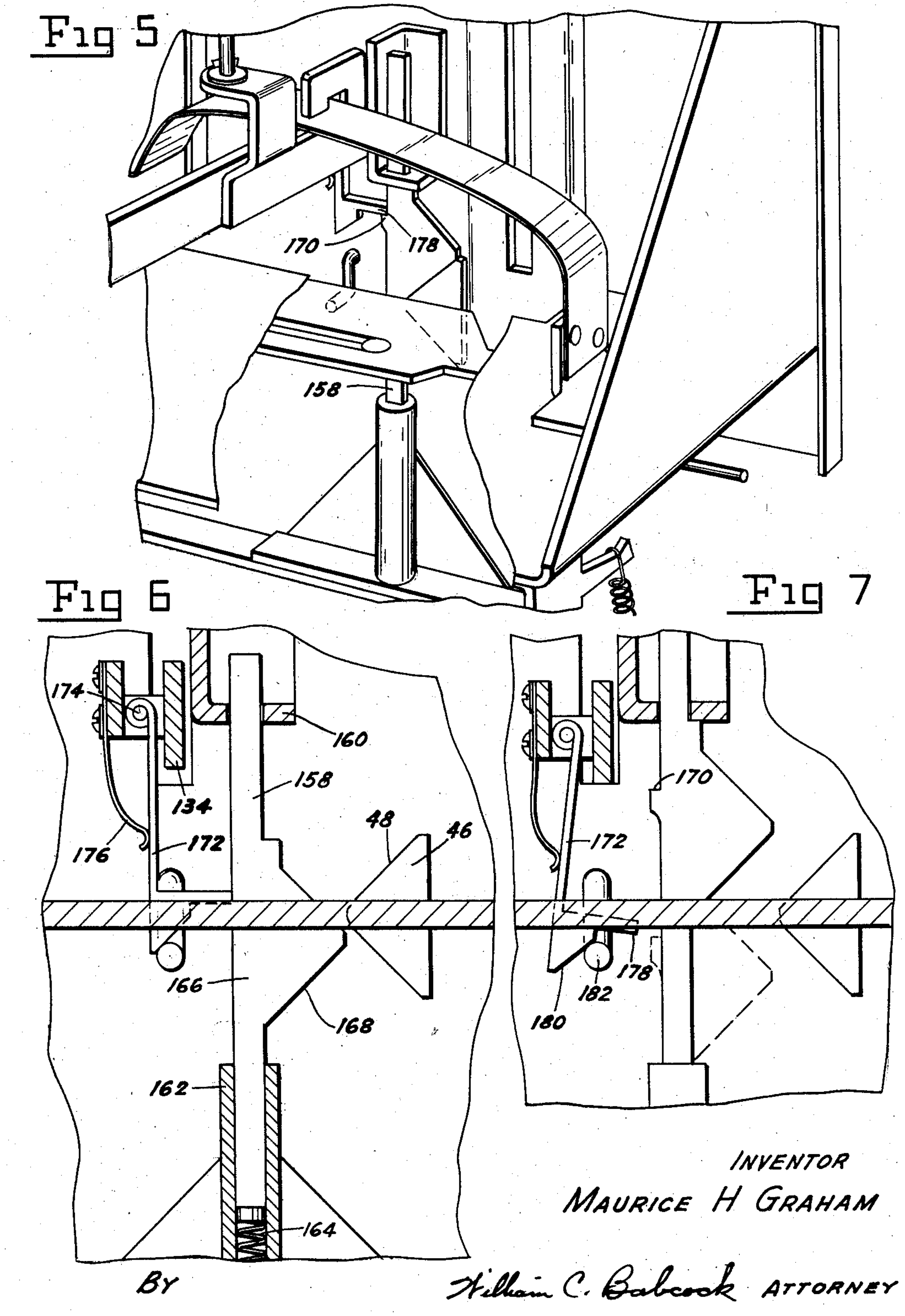
Fig. 5 is an enlarged partial perspective view similar to Fig. 4, but with additional portions broken away to show details of the setting means for the timing device.
Fig. 6 is an enlarged partial view of the setting means of Fig. 5 just prior to completion of the movement of the parts from th position of Fig. 3 to the position of Fig. 4.
Fig. 7 is a view similar to Fig. 6 showing the parts just after completion of the movement of the parts to the position of Fig. 4.

Figs. 5, 6 and 7 illustrate in detail the setting means by which the timing member 20 is moved to its first or starting position at the beginning of the timed interval. For this purpose a setting member 158 is supported in guides 160 and 162 on the toaster casing for vertical sliding movement closely adjacent the path of vertical movement of the starting lever 134. A spring 164 resiliently urges the setting slide 158 upwardly to the position shown in heavy lines in Fig. 7. Slide 158 carries a projection 166 having an inclined cam surface 168. This surface 168 is designed for engagement with the inclined cam surface 48 on the timing escapement member 20 to move the latter from the position of Fig. 1 to the starting position illustrated schematically in Fig. 8.

In order to insure the desired movement of the setting member 158 in response to movement of the actuating lever 134, the member 158 is provided with an upwardly facing abutment 170. The starting lever 134 carries a cocking pawl 172 pivotally mounted with respect to the lever 174. A spring 176 normally urges the cocking lever 172 to the right in Figs. 5 and 6 so that the end 178 of the pawl 172 will engage above the abutment 170.

By means of this engagement, downward movement of the lever 134 from the position of Fig. 3 to the position of Fig. 4 will move the slide 158 downwardly from the position of Fig. 5 to the position of Fig. 6. During this movement, the cam surface 48 will be engaged by cam 168 to move the escapement member 20 from its second position, as illustrated in Figs. 1 and 5, to its first or starting position as illustrated in Figs. 6, 7 and 8.

In order to permit immediate upward return movement of the setting member 158, so that it will be out of the path of projection 46 and cam surface 48 during the step wise return movement of the timing member during operation, the cocking lever 172 is provided with a cam surface 180. This surface engages a projection or stop 182 just as the starting lever 134 reaches its lowermost position. The engagement of the cam surface 180 and stop 182 as shown in Fig. 7 moves the cocking lever 172 to the left against the resilience of spring 176 and thus moves the projection 178 out of engagement with the abutment 170 on the setting slide. The slide is then free to move back to its upper position as shown in heavy lines in Fig. 7 under the influence of spring 164. In that position, the projection 166 of the slide will be out of the way, so that step wise return movement of timing escapement 20 and its projection 46 may take place.

Figure 8:
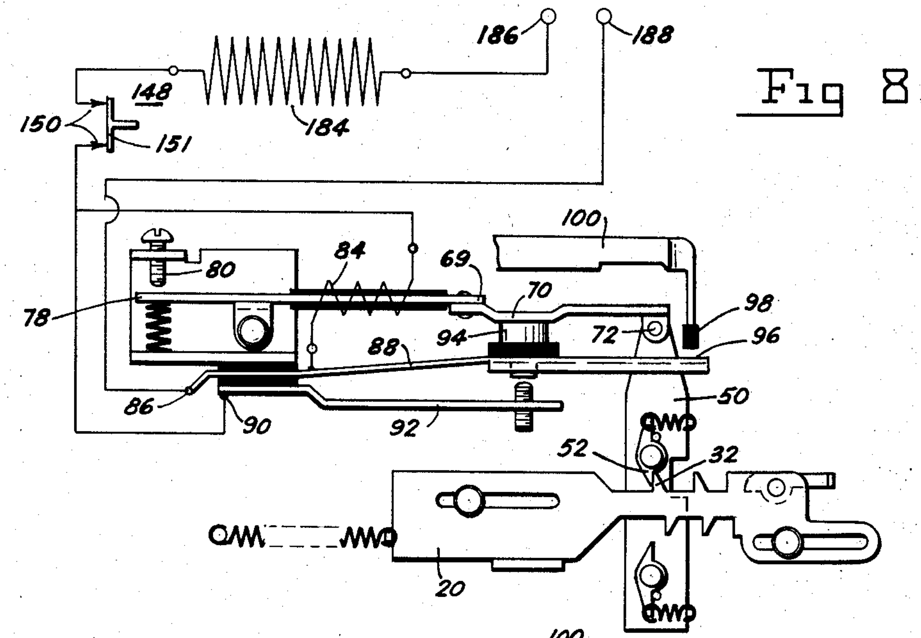
Fig. 8 is a partial schematic view of the timing device of Fig. 1 just after the parts have been moved to the position of Fig. 4.

Operation of the device just described will be apparent from Figs. 8 through 13. In Fig. 8 the timing device is shown schematically with the remainder of the toaster circuit details included. The main toaster heating element has been indicated at 184. This element and the switch parts of the timing device are connected to line terminals 186 and 188 which may provide a convenient source of supply voltage such as 110 volts A. C.

The terminals 86 and 90 of the timing device switch blades 88 and 92 and of the electric heater 84 are effectively connected in circuit with the main heating element and the main toaster switch contacts 150. Thus when the operating lever 134 is initially depressed, the bridging contact 151 will engage the contacts 150 to complete a circuit which includes both the main toaster heating element 184 and initially the bimetal heater 84. In this initial position the timing slide 20 will have been pushed to the right in Fig. 8 and held in that position by engagement of pawl 52 with ratchet lug 32 as shown. Passage of current through the bimetal heater 84 will then cause deflection of bimetal so that its ends will tend to move upwardly with respect to the pivotal support.

As shown in Fig. 8, there is initially a gap between the second end 78 of the bimetal and the adjusting screw 80. Initial heating of the bimetal will cause an overall flexing which will result in movement only of the second end 78, in view of this space and the direct attachment of the first end 69 to the pawl slide 50. The second end will accordingly warp up toward the adjusting screw 80, as the bimetal is heated from its cold position.

Figure 9:
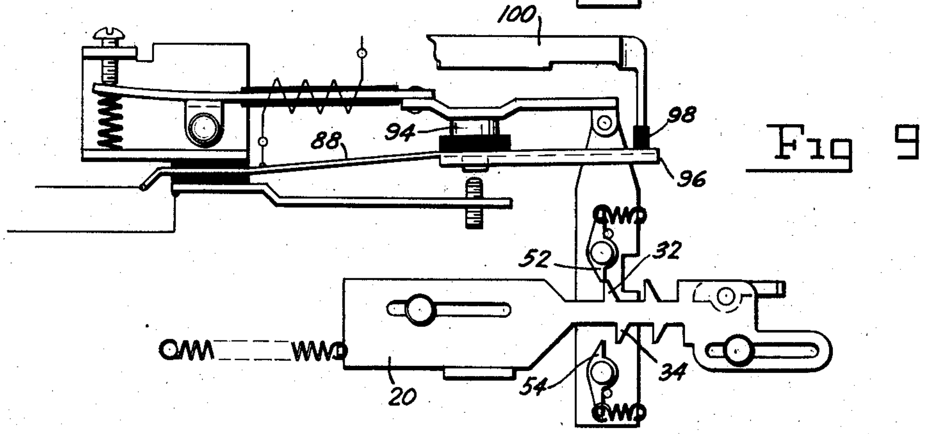
Fig. 9 is a view similar to Fig. 8 showing the parts just prior to the end of the first heating cycle.

Once the end 78 engages the screw 80 as shown in Fig. 9, further warping of the bimetal will necessarily cause the first end 69 and the pawl slide 50 to move upwardly. In Fig. 9, this upward movement has progressed to a point where the pawl 52 is almost at the point of disengagement from tooth 32. The spacing between the pawls is such that in this position the pawl 54 has moved upwardly far enough so that it will be in position to engage the second ratchet tooth 34 as soon as the pawl 52 releases the first tooth. Thus the timing escapement 20 will move one notch to the left.

Throughout this heating movement as illustrated in Figs. 8 and 9, the bimetal heater 84 has remained in circuit because magnet 94 is attracted to armature 70 and tends to pull the upper contact arm 88 upwardly against its normal downward bias, so that its contact will not engage the cooperating contact on the lower arm 92. As the parts reach the position of Fig. 9, however, the end 96 of the contact arm 88 strikes the end 98 of the adjustable timing lever 100. Further upward movement of the contact arm 88 is accordingly arrested.

Figure 10:
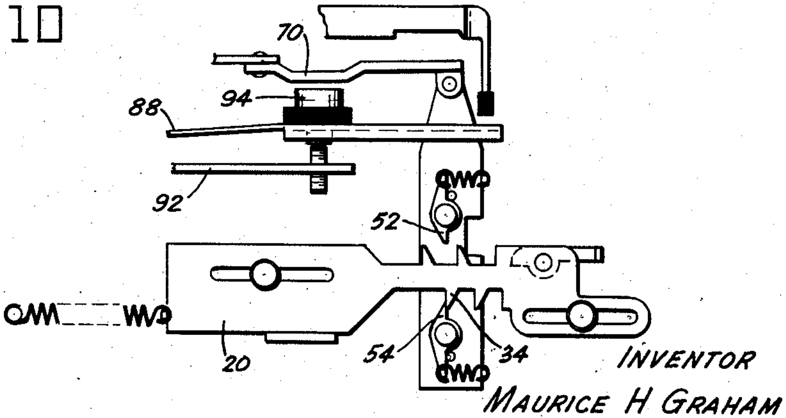
Fig. 10 shows the position of the parts just after the heating cycle of Figs. 8 and 9 has ended, i. e., during the first cooling cycle of the device.

Therefore as soon as the bimetal is heated sufficiently to generate a deflection force which will overcome the magnetic attraction between parts 94 and 70, the armature 70 and pawl slide 50 will snap upwardly to the extreme limit of their movement as shown in Fig. 10. At this point the resilient bias of the contact arm 88 will urge the contact downwardly so that the contacts on the respective arms 88 and 92 will engage each other to bypass or shunt the heating element 84. The bimetal strip will accordingly cool and tend to straighten out again.

Figure 11:
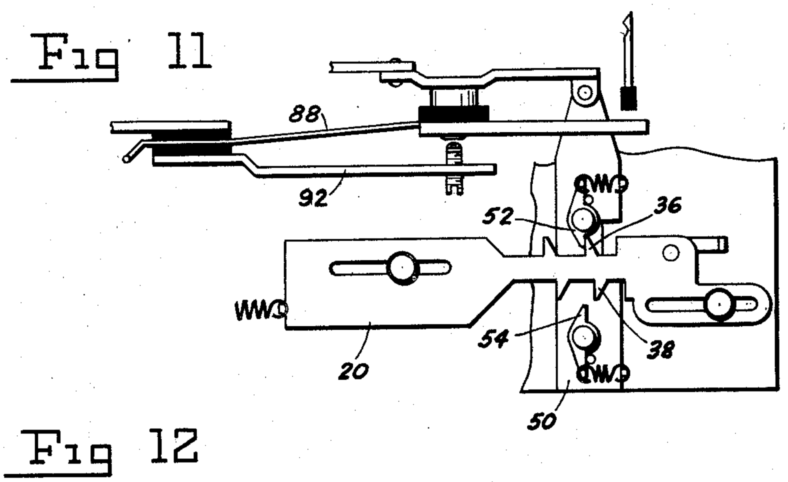
Fig. 11 is a similar view showing the parts after completion of the first cooling cycle and start of the second heating cycle.
Figure 12:
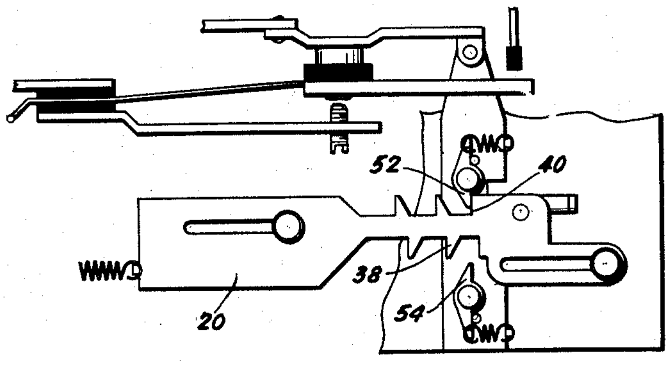
Fig. 12 is a similar view showing the parts after a second cooling cycle has been completed, i. e., at the start of a third heating cycle.

During this cooling step the armature 70 and pawl slide 50 will gradually move downwardly again until the pawl 54 disengages the tooth 34 and the pawl 52 intercepts the third tooth or abutment 36 as shown in Fig. 11. At this same time, the downward movement of the armature 70 brings it within range of magnet 94. The magnet and its associated contact arm are then attracted upwardly to open the contacts carried by arms 88 and 92 as also indicated in Fig. 11. Thus the bimetal heater 84 will be back in circuit and the bimetallic strip will be heated and deflected again.

At the end of this second heating cycle the pawl 52 will disengage the tooth 36 and permit the pawl 54 to engage the next ratchet tooth 38. Another cooling cycle will then follow in the manner previously described. This second cooling cycle has been omitted from the drawings for brevity. At the end of the second cooling step the parts will then be in the position shown in Fig. 12 in which the pawl 52 engages the shoulder or abutment 40. As the parts reach the position of Fig. 12 the end 126 of the tripping lever 108 will have been brought into the notch 130 (Fig. 2) so that the lever end 126 is in the path of subsequent upward movement of the release abutment 128.

Figure 13:
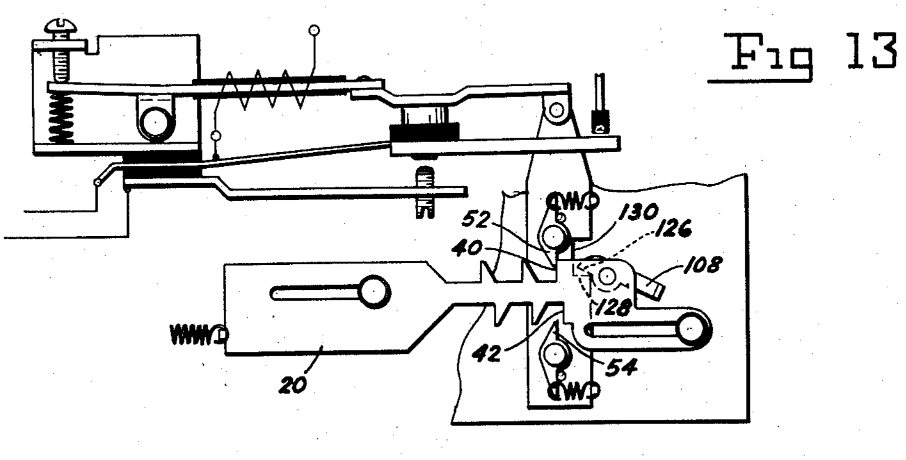
Fig. 13 shows the position of the parts during the third heating cycle to indicate operation of the release means which terminates the timed interval.

The final heating cycle of the bimetal will next take place. During this cycle the pawl slide 54 will move upwardly and will rock the tripping lever 108 as shown in Figs. 2 and 13 to pull the connecting arm 118 (Fig. 1) and thus shift the latch member 122 so that its retaining lug 144 (Fig. 4) will disengage the lever end 142 and permit movement of the operating lever 134 back up from the position of Fig. 4 to the position of Fig. 3. This movement will open the main switch at 150 and terminate the operation of the main toaster heating element 124 as well as further operation of the bimetal heater 84.

If a long enough interval is left before the next operation of the device, the bimetal 61 may cool all the way to its original position of Fig. 8. This would be the situation if the interval is long enough so that the toaster could be substantially cooled to room temperature. If, however, the second operation of the toaster takes place before the bimetal 61 is fully cooled, the initial heating cycle of the sequence described above will either be substantially shortened or possibly omitted entirely. Thus the total timing period would be substantially shorter, as is necessary in the case of a toaster in which the oven is already heated.

Furthermore, the initial spacing between the end 78 of the bimetal and the adjustable stop 80 provides additional compensation for variations in the ambient temperature and in the interval between operations of the device. Thus if the bimetal 61 has not completely cooled, the end 78 may remain in engagement with screw 80 so that the initial warm-up period during which the end 78 was flexed into engagement with screw 80, will be omitted. Thus the spacing between the bimetal end 78 and its stop, and the arrangement of the timing device so that the interval is terminated during a heating cycle of the bimetal, contribute to provide automatic compensating means to shorten a subsequent toasting interval appropriately in accordance with the ambient temperature and particular interval between operations.

The shaft 106 and cam 104 provide a convenient adjustment of the total time interval. If the lever arm 100 is positioned to intercept the contact end 96 earlier in the heating cycle, each of the heating periods of the total time interval will be shortened. Also, since the bimetal does not reach so high a temperature, the cooling periods will be correspondingly shortened. In this manner adjustment of the position of end 98 of lever 100 by means of control shaft 106 provides a convenient method of adjustment of the total time interval to be measured by the device.

The timing device described in the foregoing specification substantially accomplishes the objects previously set forth and provides a construction which operates efficiently and which can be constructed economically. The device may be adapted to a wide range of possible uses by virtue of the plurality of available adjustments, including the initial adjustment of the stop 80, the adjustment of the lever 100 to determine the position at which the heating cycle will be terminated, and the possible adjustment of the contact screw on the lower contact arm 92.

Since minor variations and changes in the exact details of construction will be apparent to persons skilled in this field, it is intended that this invention shall cover all such changes and modifications as fall within the spirit and scope of the attached claims.

I claim as my invention:

1. A timing device having a timing member movable from a first position to a second position to measure a timed interval, cyclically movable means controlling the period of movement of said timing member from its first to its second position, release means adapted for operation at the termination of said interval, said release means including a tripping member mounted on said timing member for relative movement between normal and tripping positions, said tripping member being carried by said timing member in a relative location and position free of driven engagement with the cyclically movable means whenever the timing member is out of said second position and being moved by said timing member into driven engagement with said cyclically movable means when the timing member moves to its second position, and said tripping member being moved from its normal to its tripping position by the movement of said cyclically movable means after the timing member has moved to second position to establish said driven engagement, whereby said cyclically movable means actuates said release means only at the end of the desired interval.

2. A timing device according to claim 1 in which said timing member consists of a toothed escapement member movable along a given path, said cyclically movable means includes a pawl slide cyclically reciprocable across said path and having a release abutment thereon, and said tripping member consists of a lever pivoted on said escapement member and having a projection engaged by said abutment to move the lever in response to reciprocation of the pawl slide when the escapement member reaches its second position.

3. A timing device according to claim 2 in which the cyclically movable means includes a thermally responsive member operatively connected to reciprocate said pawl slide in response to cyclic heating and cooling of said thermally responsive member.

4. A timing device according to claim 3 having movable starting means operatively connected to initiate said cyclic heating and cooling and to move said escapement member from its second to its first position in response to movement of the starting means at the start of a timed interval.

5. A timing device according to claim 3 in which said thermally responsive member includes a bimetallic strip pivotally supported at an intermediate point between its ends, said strip having a first end connected directly to said pawl slide to reciprocate the latter, and temperature compensating means including an adjustable stop initially spaced from the second end of the strip when the strip is cold, initial heating of the strip causing deflection of said second end against the stop without movement of the pawl slide and further heating of the strip causing movement of the slide, whereby the time required for initial movement of the slide is automatically varied in dependence on the ambient temperature and the length of the inactive period between successive operations of the timing device.

6. A timing device having an escapement member movable from a first position to a second position to measure a timed interval, cyclically movable pawl mechanism engaging said escapement member and requiring step wise movement of the latter from its first to its second position in response to cyclic movement of the pawl mechanism, release means adapted for operation at the termination of said interval, said release means including a tripping member carried by said escapement member and movable thereon between normal and tripping positions, and cooperating means on the pawl mechanism and tripping member for directly driving the tripping member from normal to tripping position by movement of the pawl mechanism, said cooperating means having a relative location and position free of driving engagement with each other whenever the escapement member is out of said second position and being brought into effective operating engagement with each other only when said escapement member reaches its second position.

7. In a timing device having a movable setting member operable from an inactive to an active position to initiate a timed interval and adapted to return to inactive position at the end of the interval, a latch member for preventing such return until the end of the desired interval, release means operatively connected for movement of said latch to a releasing position in which the setting member is free to return to inactive position, the improvement comprising an escapement member, means urging the escapement member from a first position to a second position, means operatively connecting said setting member and escapement member for movement of the latter from second to first position in response to movement of the setting member to active position, cyclically movable pawl mechanism engaging said escapement member and requiring step wise movement of the latter from its first to its second position in response to cyclic movement of the pawl mechanism, and a tripping member carried by said escapement member and operatively connected for actuating said release means, said tripping member and said pawl mechanism having normally disconnected cooperating means movable into operatively connected relationship with each other in response to movement of the escapement member to its second position, further movement of the pawl mechanism thereby operating the tripping member and the release means to permit movement of the setting member back to inactive position and terminate the timed interval after said escapement member has reached said second position.

8. A self-compensating thermal timing device comprising a timing escapement member movable from a first position to a second position to measure a timed interval, cyclically operable pawl mechanism including a reciprocable member engaging said escapement member and requiring step wise movement of the latter from its first to its second position, a bimetallic strip having first and second oppositely extending ends and pivotally supported between said ends, and means for cyclically heating and cooling said strip, the first end of said strip being connected to said reciprocable member to move it back and forth in response to successive alternate deflections of said first end during said cyclic heating and cooling, and temperature compensating means including an adjustable stop movable to a position initially spaced from said second end when the strip is cold, initial heating of the strip causing deflection of the second end against said stop without movement of said first end and reciprocable member, and further heating of the strip causing movement of the first end and reciprocating member, whereby the time required for initial movement of the reciprocating member in response to said heating of the strip and said deflection and movement of said strip ends is automatically varied in response to the ambient temperature and the period of inactivity between successive operations of the device.

References Cited in the file of this patent

UNITED STATES PATENTS

| | | |
|---|---|---|
| 1,794,067 | Extrom et al. | Feb. 24, 1931 |
| 1,795,013 | Denman | Mar. 3, 1931 |
| 2,436,735 | Walder et al. | Feb. 24, 1948 |
| 2,502,180 | Smulski | Mar. 28, 1950 |
| 2,539,185 | Dayton | Jan. 23, 1951 |
| 2,622,677 | Caffier et al. | Dec. 23, 1952 |
| 2,624,269 | Hild | Jan. 6, 1953 |